United States Patent
Huang et al.

(10) Patent No.: US 9,517,612 B2
(45) Date of Patent: Dec. 13, 2016

(54) FLOOR MATERIAL USING PLA RESIN

(75) Inventors: Cheng-Zhe Huang, Cheongju-si (KR);
Ji-Young Kim, Nam-gu Ulsan (KR);
Ki-Bong Park, Seoul (KR);
Chang-Won Kang, Cheongju-si (KR);
Jun-Hyuk Kwon, Gunpo-si (KR);
Hyun-Jong Kwon, Nam-gu Ulsan (KR); Sang-Sun Park, Cheongju-si (KR); Jang-Ki Kim, Cheongju-si (KR); Gyeong-Min Lee, Nam-gu Ulsan (KR)

(73) Assignee: LG HAUSYS, LTD., Seoul (KR)

( * ) Notice: Subject to any disclaimer, the term of this patent is extended or adjusted under 35 U.S.C. 154(b) by 447 days.

(21) Appl. No.: 13/634,485

(22) PCT Filed: Mar. 15, 2011

(86) PCT No.: PCT/KR2011/001812
§ 371 (c)(1),
(2), (4) Date: Sep. 12, 2012

(87) PCT Pub. No.: WO2011/115413
PCT Pub. Date: Sep. 22, 2011

(65) Prior Publication Data
US 2013/0004751 A1  Jan. 3, 2013

(30) Foreign Application Priority Data
Mar. 15, 2010  (KR) .......... 10-2010-0023051

(51) Int. Cl.
*E04F 15/10* (2006.01)
*B32B 27/30* (2006.01)
(Continued)

(52) U.S. Cl.
CPC .......... *B32B 27/36* (2013.01); *B32B 2307/412* (2013.01); *B32B 2471/00* (2013.01);
(Continued)

(58) Field of Classification Search
CPC ..... B32B 27/00; D06N 7/0028; B44C 5/0469; B41M 7/0027; B41M 7/0072
(Continued)

(56) References Cited

U.S. PATENT DOCUMENTS

| 7,354,656 B2* | 4/2008 | Mohanty et al. | 428/523 |
| 2009/0148715 A1* | 6/2009 | Lee | 428/480 |
| 2010/0015420 A1* | 1/2010 | Riebel et al. | 428/203 |

FOREIGN PATENT DOCUMENTS

| CN | 1906248 A | 1/2007 |
| CN | 101044020 A | 9/2007 |

(Continued)

OTHER PUBLICATIONS

Machine_English_Translation_JP_2009235365_A; Iizaka, Hirofumi; Polylactic Acid Composite Molding; Oct. 15, 2009; JPO; whole document.*

(Continued)

*Primary Examiner* — Tahseen N Khan
(74) *Attorney, Agent, or Firm* — Nath, Goldberg & Meyer; Joshua B. Goldberg

(57) ABSTRACT

Disclosed is a flooring material using an environment-friendly PLA resin. According to the present invention, the flooring material using the PLA resin comprises: a base layer; a print layer which is formed on top of the base layer, and has a print pattern on an upper side thereof; and a transparent layer which is formed on top of the print layer, wherein one or more of the base layer, the print layer, and the transparent layer include polylactic acid (PLA) resin.

15 Claims, 1 Drawing Sheet

(51) Int. Cl.
  *B32B 27/08*  (2006.01)
  *B32B 27/36*  (2006.01)
(52) U.S. Cl.
  CPC ........... *E04F 15/105* (2013.01); *E04F 15/107* (2013.01); *Y10T 428/24868* (2015.01)
(58) Field of Classification Search
  USPC ....................................................... 428/203
  See application file for complete search history.

(56) References Cited

FOREIGN PATENT DOCUMENTS

| | | | |
|---|---|---|---|
| JP | 2003-027723 A | | 1/2003 |
| JP | 2004018592 A | | 1/2004 |
| JP | 2004106314 A | | 4/2004 |
| JP | 2004196967 A | | 7/2004 |
| JP | 2004314460 A | | 11/2004 |
| JP | 2005212242 A | | 8/2005 |
| JP | 2005-263932 A | | 9/2005 |
| JP | 2005232828 A | | 9/2005 |
| JP | 2007076192 A | | 3/2007 |
| JP | 2007216541 A | | 8/2007 |
| JP | 2008056745 A | | 3/2008 |
| JP | 2008062428 A | | 3/2008 |
| JP | 2008073998 A | | 4/2008 |
| JP | 2008080703 A | | 4/2008 |
| JP | 2008094871 A | | 4/2008 |
| JP | 2008-207441 A | | 9/2008 |
| JP | 2008238528 A | | 10/2008 |
| JP | 2008302615 A | | 12/2008 |
| JP | 2009501096 A | | 1/2009 |
| JP | 2009178880 A | | 8/2009 |
| JP | 2009184167 A | | 8/2009 |
| JP | 2009196288 A | | 9/2009 |
| JP | 2009235365 A | * | 10/2009 |
| JP | 2010006041 A | | 1/2010 |
| JP | 2010052305 A | | 3/2010 |
| JP | 2010052308 A | | 3/2010 |
| JP | 2010234764 A | | 10/2010 |
| KR | 10-1991-0003324 B1 | | 5/1991 |
| KR | 10-0824530 A | | 4/2008 |
| WO | 2009045564 A1 | | 4/2009 |
| WO | 2009/120311 A2 | | 10/2009 |

OTHER PUBLICATIONS

Extended European Search Report issued in European Patent Application No. 11756544.0 dated Apr. 29, 2014, six (6) pages.
Official Action issued in Chinese Patent Application No. 201180011871.8 dated May 21, 2014, seven (7) pages.
Notice of Allowance issued in Korean Patent Application No. 1020100023051 dated Jul. 27, 2014, two (2) pages.
Japanese Patent Application No. 537270, Office Action dated Oct. 14, 2014, four (4) pages.
Japanese Patent Application No. 2012-544406, Notice of Allowance dated Apr. 21, 2015, three (3) pages.
European Office Action dated Sep. 27, 2016 in EP Application No. 11756544.0-1308.

* cited by examiner

US 9,517,612 B2

FLOOR MATERIAL USING PLA RESIN

This is a National Phase Application filed under 35 U.S.C. 371 as a national stage of PCT/KR2011/001812, filed Mar. 15, 2011, an application claiming benefit from the Korean Application No. 10-2010-0023051, filed Mar. 15, 2010, the content of each of which is hereby incorporated by reference in its entirety.

TECHNICAL FIELD

The present invention relates to flooring materials, and more particularly, to a flooring material, which includes a base layer, a balance layer and the like, formed using a polylactic acid (PLA) resin, an environmentally friendly plasticizer such as acetyl tributyl citrate (ATBC) to realize environmental friendliness, and an acrylic copolymer as a melt strength enhancer, thereby facilitating calendering, pressing, and the like.

BACKGROUND ART

Flooring materials used for buildings, such as houses, apartments, offices, and stores, generally include petroleum resins such as polyvinyl chloride (PVC).

Such flooring materials are manufactured by extrusion or calendering of PVC resins. However, since PVC resins are derived from petroleum, a difficulty may occur in terms of supply of raw materials in the future due to the exhaustion of petroleum resources.

Further, PVC flooring materials generally generate a large amount of toxic substances in use or when discarded in view of environmental considerations.

DISCLOSURE

Technical Problem

The present invention is directed to providing a flooring material which employs a PLA resin, thereby solving a problem regarding supply of raw materials for respective layers of the flooring material while realizing environmental friendliness.

Technical Solution

One aspect of the present invention provides a flooring material using a polylactic acid (PLA) resin, which includes a base layer; a print layer formed on top of the base layer and having a printed pattern on an upper surface of the print layer; and a transparent layer formed on top of the print layer, wherein at least one of the base layer, the print layer and the transparent layer includes a PLA resin.

Another aspect of the present invention provides a flooring material using a polylactic acid (PLA) resin, which includes a base layer; a print layer formed on top of the base layer and having a printed pattern on an upper surface of the print layer; a transparent layer formed on top of the print layer; and a release layer formed on a lower surface of the base layer, wherein at least one of the base layer, the print layer, the transparent layer and the release layer includes a PLA resin.

The flooring material may further include a surface treatment layer formed on top of the transparent layer.

Advantageous Effects

According to the present invention, a PLA resin based on plant resources is employed instead of PVC derived from petroleum resources, thereby solving a problem regarding supply of raw materials.

In addition, the flooring material according to the present invention generates few toxic substances such as $CO_2$ in fabrication of layers such as a base layer, a release layer, and the like, and facilitates disposal of the flooring material, thereby realizing environmental friendliness.

Further, in the flooring material according the present invention, the base layer and the release layer are formed using wood flour and pine resin, thereby providing the texture of natural wood and the unique fragrance of trees.

Further, according to the present invention, the PLA resin includes an acrylic copolymer as a melt strength enhancer, thereby facilitating melt extrusion, calendering or pressing of the PLA resin.

MODE FOR INVENTION

Figure 1:
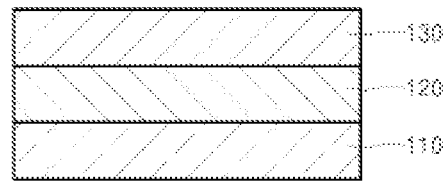
FIGS. 1 to 4 are side-sectional views of a flooring material using a PLA resin according to exemplary embodiments of the present invention.

The above and other aspects, features, and advantages of the invention will become apparent from the detailed description of the following embodiments in conjunction with the accompanying drawings. It should be understood that the present invention is not limited to the following embodiments and may be embodied in different ways, and that the embodiments are given to provide complete disclosure of the invention and to provide a thorough understanding of the invention to those skilled in the art. The scope of the invention is defined only by the claims. Like components will be denoted by like reference numerals throughout the specification.

Exemplary embodiments of the present invention will be described in detail with reference to the accompanying drawings.

FIG. 1 is a side-sectional view of a flooring material using a PLA resin according to one exemplary embodiment of the present invention.

In FIG. 1, the flooring material includes a base layer 110, a print layer 120, and a transparent layer 130. In the flooring material according to this embodiment, at least one of the base layer 110, the print layer 120 and the transparent layer 130 includes a polylactic acid (PLA) resin.

Figure 2:
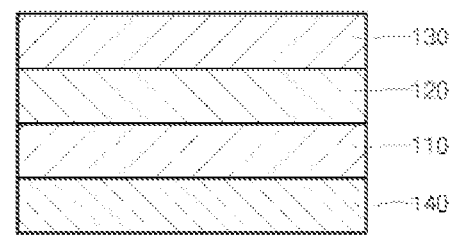

FIG. 2 is a side-sectional view of a flooring material using a PLA resin according to another exemplary embodiment of the present invention.

In FIG. 2, the flooring material includes a base layer 110, a print layer 120, a transparent layer 130, and a release layer 140 formed on a lower side of the base layer 110. In the flooring material according to this embodiment, at least one of the base layer 110, the print layer 120, the transparent layer 130 and the release layer 140 includes a PLA resin.

The PLA resin is a thermoplastic polyester of lactide or lactic acid, which can be prepared by polymerization of lactic acid obtained by fermentation of starch extracted from renewable plant resources, such as corn and potato. Since corn and potato are renewable plant resources, the PLA resin based on such plant resources may effectively solve problems caused by depletion of petroleum resource.

Further, the PLA resin is an environmentally friendly material in that it discharges remarkably less toxic substances to the environment, for example, $CO_2$, in use or when discarded than petroleum-based materials, for example, polyvinyl chloride (PVC), and is readily biodegraded when discarded.

The PLA resin may be generally classified into a crystalline PLA (c-PLA) resin and an amorphous PLA (a-PLA) resin. Since the crystalline PLA resin can cause bleeding of a plasticizer towards a sheet surface, the amorphous PLA resin may be used. The amorphous PLA resin provides an advantage of eliminating use of compatibilizing agents, which are added to prevent bleeding of the plasticizer. When using the amorphous PLA resin, a 100% amorphous PLA resin may be used as the PLA resin. As needed, a PLA resin exhibiting both crystalline and amorphous properties may be used.

When one of the base layer 110, the print layer 120, the transparent layer 130, and the release layer 140 includes the PLA resin, the PLA resin may include a non-phthalate plasticizer or an acrylic copolymer as a melt strength enhancer.

The non-phthalate plasticizer is an environmentally friendly plasticizer and softens the PLA resin to improve thermoplasticity, facilitating molding at high temperature. In one embodiment, acetyl tributyl citrate (ATBC) may be used as the non-phthalate plasticizer.

For the base layer 110, the non-phthalate plasticizer may be present in an amount of 5 to 100 parts by weight based on 100 parts by weight of the PLA resin, and for the print layer 120 or the release layer 140, the non-phthalate plasticizer may be present in an amount of 5 to 60 parts by weight based on 100 parts by weight of the PLA resin. For the transparent layer 130, the non-phthalate plasticizer may be present in an amount of 5 to 50 parts by weight based on 100 parts by weight of the PLA resin.

If the amount of the non-phthalate plasticizer is less than 5 parts by weight based on 100 parts by weight of the PLA resin in the respective layer, hardness of the PLA resin can increase, thereby reducing processability. If the non-phthalate plasticizer is added in an amount exceeding the above ranges in the respective layers, compatibility with other components decreases, thereby deteriorating physical properties.

An acrylic copolymer is used as the melt strength enhancer. Since the PLA resin has low melt strength or thermal resistance, the acrylic copolymer serves to improve melt strength of the PLA resin and permit calendering and pressing by complementing such drawbacks of the PLA resin.

In each of the base layer 110, the print layer 120, the transparent layer 130, and the release layer 140, the acrylic copolymer may be commonly present in an amount of 0.1 to 20 parts by weight based on 100 parts by weight of the PLA resin. If the amount of the acrylic copolymer is less than 0.1 parts by weight, the melt efficiency and melt strength of the PLA resin cannot sufficiently improve. If the amount of the acrylic copolymer exceeds 20 parts by weight, manufacturing costs of the respective layers of the flooring material can be increased and overall physical properties of the respective layers can be deteriorated due to inappropriate compatibility with other components forming the respective layers.

Further, when any one of the base layer 110, the print layer 120, the transparent layer 130, and the release layer 140 includes the PLA resin, the PLA resin may further include at least one of a lubricant, a chain extender, and an anti-hydrolysis agent.

The lubricant may be added to the PLA resin to prevent the resin from adhering to a calendar roll or press roll during processes such as calendaring, pressing and the like.

Although there are various kinds of lubricants, environmentally friendly lubricants, such as higher fatty acids, may be adopted in some embodiments of the invention, specifically, a saturated fatty acid with an 18 carbon chain, such as stearic acid, may be used.

In each of the base layer 110, the print layer 120, the transparent layer 130, and the release layer 140, the lubricant may be commonly present in an amount of 0.01 to 10 parts by weight based on 100 parts by weight of the PLA resin. If the amount of the lubricant is less than 0.01 parts by weight based on 100 parts by weight of the PLA resin, the lubricant does not work effectively. If the amount of the lubricant exceeds 10 parts by weight based on 100 parts by weight of the PLA resin, the PLA resin can be deteriorated in terms of impact resistance, heat resistance, and gloss.

The chain extender serves to improve tensile strength, heat resistance and the like by increasing molecular weight through chain extension.

Examples of the chain extender may include diisocyanate, epoxy group copolymers, and hydroxycarboxylic compounds, without being limited thereto.

In each of the base layer 110, the print layer 120, the transparent layer 130, and the release layer 140, the chain extender may be commonly present in an amount of 0.01 to 10 parts by weight based on 100 parts by weight of the PLA resin. If the amount of the chain extender is less than 0.01 parts by weight based on 100 parts by weight of the PLA resin, the chain extender does not work effectively, and if the amount of the chain extender exceeds 10 parts by weight based on 100 parts by weight of the PLA resin, gloss of the PLA resin can be deteriorated.

The anti-hydrolysis agent serves to prevent deterioration in mechanical properties of the PLA resin including impact resistance through hydrolysis of the PLA resin.

Any typical anti-hydrolysis agent including polycarbodiimide, carbodiimide, oxazoline and the like may used In each of the base layer 110, the print layer 120, the transparent layer 130, and the release layer 140, the anti-hydrolysis agent may be commonly present in an amount of 10 parts by weight or less based on 100 parts by weight of the PLA resin. If the amount of the anti-hydrolysis agent exceeds 10 parts by weight based on 100 parts by weight of the PLA resin, molding processibility can be deteriorated and manufacturing costs can significantly increase since the anti-hydrolysis agent is expensive.

Meanwhile, when the PLA resin is applied to the print layer 120, each of the layers may further include calcium carbide ($CaCO_3$) as reinforcing inorganic fillers, or titanium dioxide ($TiO_2$) as white pigments for aesthetic purposes.

In the base layer 110, calcium carbide may be present in an amount of 1,000 parts by weight or less based on 100 parts by weight of the PLA resin; in the print layer 120, calcium carbide may be present in an amount of 100 parts by weight or less based on 100 parts by weight of the PLA resin; and in the release layer 140, calcium carbide may be present in an amount of 500 parts by weight or less based on 100 parts by weight of the PLA resin. Further, titanium dioxide may be present in an amount of 50 parts by weight or less in the print layer 120, based on 100 parts by weight of the PLA resin. If the amount of calcium carbide or titanium dioxide exceeds these ranges, there is a problem of deterioration in processability due to reduction in coupling force between components.

The base layer 110 or the release layer 140 may further include wood flour or pine resin to provide the texture of natural wood and the unique fragrance of trees.

In each of the base layer 110 and the release layer 140, wood flour may be commonly present in an amount of 200 parts by weight or less based on 100 parts by weight of the PLA resin, and pine resin may be commonly present in an amount of 20 parts by weight or less based on 100 parts by weight of the PLA resin. Although the effect of providing the texture of natural wood can increase with increasing amounts of the wood flour and pine resin in the base layer 110 and the release layer 140, the amounts of the wood flour and pine resin exceeding these ranges can cause deterioration in formability without increasing the effect of providing the texture of natural wood.

Next, each of the base layer 110, the print layer 120, the transparent layer 130 and the release layer 140 will be described with reference to FIG. 1 and FIG. 2.

In the present invention, the base layer 110 is a fundamental layer of the flooring material and serves to support the print layer 120 and the transparent layer 130 while absorbing impact applied thereto.

The base layer 110 may have a thickness of 1.0 to 5.0 mm. If the thickness of the base layer 110 is less than 1.0 mm, such functions of the base layer cannot be sufficiently realized, and if the thickness of the base layer 110 exceeds 5.0 mm, the amount of the PLA resin increases, causing an increase in manufacturing costs of the flooring material.

As described above, the base layer 110 may be formed using a PLA resin, which contains a non-phthalate plasticizer, an acrylic copolymer, and the like. In this case, the PLA resin for the base layer may further include a lubricant, a chain extender, an anti-hydrolysis agent, calcium carbide, wood flour, pine resin, and the like, which may be used alone or in combination of two or more thereof.

The print layer 120 is formed on top of the base layer 110 and also includes a PLA resin. The print layer may have a pattern, which is formed on an upper surface thereof in a variety of ways, including transfer printing, gravure printing, screen printing, offset printing, rotary printing, flexoprinting, and ink-jet printing, to provide an aesthetic appearance to the flooring material.

The print layer 120 may be formed using a PLA resin, which contains a non-phthalate plasticizer, an acrylic copolymer, and the like. In this case, the PLA resin may further include a lubricant, a chain extender, an anti-hydrolysis agent, calcium carbide, titanium dioxide, and the like, which may be used alone or in combination of two or more thereof.

The print layer 120 may have a thickness ranging from 0.01 to 0.3 mm. If the thickness of the print layer 120 is less than 0.01 mm, it is difficult to print the pattern thereon, and if the thickness of the print layer 120 exceeds 0.3 mm, manufacturing costs of the flooring material can be increased.

The transparent layer 130 is formed on top of the print layer 120 to provide a volumetric appearance to the flooring material while protecting the pattern formed on the print layer 120.

In this invention, the transparent layer 130 is formed using a PLA resin, which contains a non-phthalate plasticizer and an acrylic copolymer, and may further include a lubricant, a chain extender, an anti-hydrolysis agent, and the like, as described above.

The transparent layer 130 may have a thickness of 0.10 to 1.0 mm. If the thickness of the transparent layer is less than 0.10 mm, it is difficult to protect the pattern formed on the print layer and the volumetric appearance of the flooring material is deteriorated. If the thickness of the transparent layer exceeds 1.0 mm, the manufacturing costs of the flooring material can be increased without significant improvement of the effects provided by the transparent layer.

In this invention, the release layer 140 will be brought into contact with a floor in construction of the flooring material on the floor and protects the backside of the flooring material while absorbing impact applied thereto.

The release layer 140 may be formed using a PLA resin, which contains a non-phthalate plasticizer, an acrylic copolymer, a lubricant, a chain extender, an anti-hydrolysis agent, and the like. In the release layer, the PLA resin may further include at least one of calcium carbide, wood flour, and pine resin. The release layer 140 may have a thickness of 0.10 to 2.0 mm to provide structural stability to the flooring material. If the thickness of the release layer 140 is less than 0.10 mm, the release layer does not sufficiently function, such that the effect of protecting the backside of the flooring material or absorbing impact is not sufficiently exhibited. If the thickness of the release layer 140 exceeds 2.0 mm, manufacturing costs of the flooring material can be increased.

Figure 3:
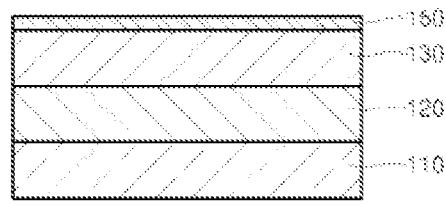
Figure 4:
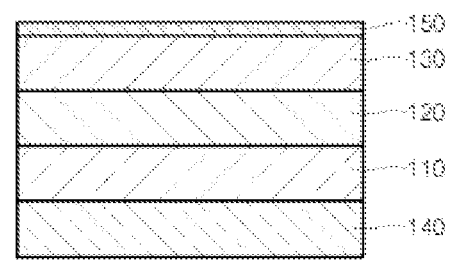

FIG. 3 and FIG. 4 are side sectional views of flooring materials using a PLA resin according to other exemplary embodiments of the present invention, each of which includes a surface treatment layer 150 on the surface of the flooring material shown in FIGS. 1 and 2.

In these embodiments, the surface treatment layer 150 is formed on the transparent layer 130 to improve surface qualities of the flooring material, including scratch resistance and abrasion resistance while enhancing contamination resistance in order to facilitate cleaning. The surface treatment layer 150 may include polyurethane, urethane acrylate, or wax.

The surface treatment layer 130 may be formed in various ways. For example, when urethane acrylate is used, a urethane acrylate UV-curable composition may be applied to an upper side of a wood chip through layer 120 and cured through UV curing, thereby forming the surface treatment layer. Alternatively, a thermosetting wax may be applied to the upper side of the wood chip through layer 120, followed by drying in a hot air oven, thereby forming the surface treatment layer.

The surface treatment layer 150 may have a thickness ranging from 0.01 to 0.1 mm. If the thickness of the surface treatment layer 150 is less than 0.01 mm, it is difficult to improve physical properties including scratch resistance, and if the thickness of the surface treatment layer 150 exceeds 0.1 mm, surface treatment entails excessive cost and the flooring material can be deteriorated in terms of appearance.

According to the present invention, there is no particular restriction as to a method of manufacturing the base layer and other layers including a PLA resin through calendering or the like. For example, the method may include mixing and kneading the aforementioned components including the PLA resin, and calendering the kneaded mixture to form a desired sheet shape.

Here, mixing and kneading the components may be carried out, for example, on liquid or powdery raw materials using a super mixer, extruder, kneader, or 2 or 3-roll. Mixing and kneading may be repeatedly performed in multiple stages so as to efficiently mix the components such that the mixed components are kneaded at about 120 to 200° C. using a Banbury mixer, and the kneaded components are subjected to primary and secondary mixing at about 120 to 200° C. using a 2-roll.

Also, there is no particular restriction as to a method of manufacturing a sheet-shaped base layer, which involves subjecting the mixed components to calendaring. For example, the base layer may be formed using a general device, e.g., an inverted "L" four-roll calender.

Further, calendering conditions may be suitably adjusted in consideration of compositions of used resin compositions. For example, calendering may be carried out at a temperature ranging from about 120 to about 200° C.

Preparation of Flooring Material According to Example and Comparative Example

Next, the present invention will be described in detail with reference to some examples of the flooring material according to the present invention. These examples are provided for illustration only and are not to be in any way construed as limiting the present invention.

A description of details apparent to those skilled in the art will be omitted herein.

Preparation of Transparent Layer (1) Preparation of Transparent Layer Via Calendering A PLA resin, a chain extender, an anti-hydrolysis agent, a plasticizer, a melt strength enhancer and a lubricant were placed in a Banbury mixer and kneaded at 140° C., followed by primary and secondary mixing with a 2-roll at 140° C. Then, the prepared mixture was subjected to calendaring at 130° C. to form a sheet having a thickness of about 0.5 mm.

(2) Preparation of Transparent Layer Via Extrusion

An about 0.5 mm thick transparent layer was prepared by mixing a PLA resin, a chain extender, an anti-hydrolysis agent and a plasticizer, followed by extrusion.

Preparation of Print Layer

A PLA resin, a plasticizer, a melt strength enhancer, a lubricant, a chain extender, an anti-hydrolysis agent, calcium carbide, and titanium dioxide were mixed, followed by the same calendering process as in preparation of the transparent layer, thereby providing a white sheet having a thickness of about 0.2 mm.

Preparation of Base Layer

A PLA resin, a plasticizer, a melt strength enhancer, a lubricant, a chain extender, an anti-hydrolysis agent, calcium carbide, wood flour, and pine resin were mixed, followed by the same calendering process as in preparation of the transparent layer, thereby providing a white sheet having a thickness of about 2 mm.

Preparation of Release Layer

A PLA resin, a plasticizer, a melt strength enhancer, a lubricant, a chain extender, an anti-hydrolysis agent, calcium carbide, wood flour, and pine resin were mixed, followed by the same calendering process as in preparation of the transparent layer, thereby providing a sheet having a thickness of about 0.7 mm.

Formation of Surface Treatment Layer

A print layer and a release layer were formed on upper and lower sides of the prepared base layer through thermal stacking to form a sheet print layer, which in turn was subjected to transfer printing to form a transparent layer on the top thereof. Then, the transparent layer was subjected to embossing treatment using an embossing roll, followed by application of a urethane acrylic UV-curable paint to the surface of the embossed transparent layer, and UV radiation to form an about 0.05 mm thick surface treatment layer, thereby providing a flooring material. In these examples, the transparent layer, the print layer, the base layer and the release layer were formed using a PLA resin.

For the flooring materials according to the examples and the comparative examples, all of the transparent layer, the print layer, the base layer, and the release layer were prepared, or some layers were prepared for evaluation of physical properties. Here, the compositions of the transparent layer, the print layer, the base layer, and the release layer are listed in Tables 1 and 2 (based on 100 parts by weight of PLA), and the amounts of the plasticizers, melt strength enhancers, lubricants, chain extenders, and anti-hydrolysis agents used for the examples and the comparative examples were listed in Table 3.

TABLE 1

| Sample | Kind of layer | PLA | Plasticizer | Melt strength enhancer | Lubricant | Chain extender | Anti-hydrolysis agent | Calcium carbide | Titanium dioxide | Wood flour | Pine resin |
|---|---|---|---|---|---|---|---|---|---|---|---|
| Example 1 | Transparent layer (Calendering) | 100 | 5 | 5 | 3 | 2 | 1 | — | — | — | — |
|  | Print layer | 100 | 10 | 5 | 3 | 2 | 1 | 100 | 10 | | |
|  | Base layer | 100 | 20 | 5 | 3 | 3 | 2 | 500 | — | 10 | 5 |
|  | Release layer | 100 | 15 | 5 | 3 | 2 | 1 | 250 | — | 10 | 5 |
| Example 2 | Transparent layer (Calendering) | 100 | 5 | 7 | 3 | 2 | 1 | — | — | — | — |
| Example 3 | Transparent layer (Calendering) | 100 | 5 | 5 | 5 | 2 | 1 | — | — | — | — |
| Example 4 | Transparent layer (Calendering) | 100 | 5 | 5 | 3 | 3 | 1 | — | — | — | — |
| Example 5 | Transparent layer (Calendering) | 100 | 5 | 5 | 3 | 2 | 2 | — | — | — | — |
| Example 6 | Print layer | 100 | 10 | 5 | 3 | 2 | 1 | 200 | — | — | — |
| Example 7 | Print layer | 100 | 10 | 5 | 3 | 2 | 1 | 100 | 8 | — | — |
| Example 8 | Print layer | 100 | 10 | 5 | 3 | 2 | 1 | 100 | 15 | — | — |
| Example 9 | Print layer | 100 | 15 | 5 | 3 | 2 | 1 | 100 | 10 | — | — |
| Example 10 | Base layer | 100 | 20 | 5 | 3 | 2 | 2 | 500 | — | 10 | 5 |

TABLE 1-continued

| Sample | Kind of layer | PLA | Plasticizer | Melt strength enhancer | Lubricant | Chain extender | Anti-hydrolysis agent | Calcium carbide | Titanium dioxide | Wood flour | Pine resin |
|---|---|---|---|---|---|---|---|---|---|---|---|
| Example 11 | Base layer | 100 | 20 | 5 | 3 | 3 | 1 | 500 | — | 10 | 5 |
| Example 12 | Release layer | 100 | 15 | 5 | 3 | 2 | 1 | 300 | — | 10 | 5 |
| Example 13 | Release layer | 100 | 15 | 5 | 3 | 1 | 1 | 250 | — | 10 | 5 |
| Example 14 | Release layer | 100 | 20 | 5 | 3 | 2 | 1 | 300 | — | 10 | 5 |

TABLE 2

| Sample | Kind of layer | PLA | Plasticizer | Melt strength enhancer | Lubricant | Chain extender | Anti-hydrolysis agent | Calcium carbide | Titanium dioxide | Wood flour | Pine resin |
|---|---|---|---|---|---|---|---|---|---|---|---|
| Comparative Example 1 | Transparent layer (Calendering) | 100 | 5 | 5 | 3 | 2 | 1 | — | — | — | — |
| Comparative Example 2 | Print layer | 100 | 10 | 5 | 3 | 2 | 1 | 100 | 20 | — | — |
| Comparative Example 3 | Release layer | 100 | 15 | 5 | 3 | 2 | 1 | 250 | 20 | 10 | 5 |
| Comparative Example 4 | Base layer | 100 | 20 | 5 | 3 | 3 | 2 | 500 | 10 | 10 | 5 |
| Comparative Example 5 | Transparent layer (Calendering) | 100 | 5 | — | 3 | 2 | 1 | — | — | — | — |
| Comparative Example 6 | Print layer | 100 | 10 | — | 3 | 2 | 1 | 100 | 20 | — | — |
| Comparative Example 7 | Release layer | 100 | 15 | — | 3 | 2 | 1 | 250 | 20 | 10 | 5 |
| Comparative Example 8 | Base layer | 100 | 20 | — | 3 | 3 | 2 | 500 | 10 | 10 | 5 |
| Comparative Example 9 | Transparent layer (Calendering) | 100 | 5 | 5 | 3 | — | 1 | — | — | — | — |
| Comparative Example 10 | Transparent layer (Calendering) | 100 | 5 | 5 | 3 | 2 | — | — | — | — | — |
| Comparative Example 11 | Transparent layer (Extrusion) | 100 | 5 | — | — | 2 | 1 | — | — | — | — |
|  | Print layer | 100 | 10 | 5 | 3 | 2 | 1 | 100 | 20 | — | — |
|  | Base layer | 100 | 20 | 5 | 3 | 3 | 2 | 500 | 10 | 10 | 5 |
|  | Release layer | 100 | 15 | 5 | 3 | 2 | 1 | 250 | 20 | 10 | 5 |
| Comparative Example 12 | Transparent layer (Calendering) | 100 | 5 | — | 3 | 2 | 1 | — | — | — | — |
| Comparative Example 13 | Transparent layer (Calendering) | 100 | 10 | 5 | — | 2 | 1 | — | — | — | — |
| Comparative Example 14 | Release layer | 100 | 15 | 5 | 3 | 2 | — | 250 | 20 | 10 | 5 |
| Comparative Example 15 | Transparent layer (Calendering) | 100 | 5 | 3 | 3 | 2 | 1 | — | — | — | — |

TABLE 3

| Sample | Plasticizer | Melt strength enhancer | Lubricant | Chain extender | Anti-hydrolysis agent |
|---|---|---|---|---|---|
| Examples 1~14 | ATBC | acrylic copolymer | stearic acid | styrene-methacrylate-glycidyl acrylate polymer | polycarbodiimide |

TABLE 3-continued

| Sample | Plasticizer | Melt strength enhancer | Lubricant | Chain extender | Anti-hydrolysis agent |
|---|---|---|---|---|---|
| Comparative Examples 1~4 | DOP(dioctyl Phthalate) | acrylic copolymer | stearic acid | styrene-methacrylate-glycidyl acrylate polymer | polycarbodiimide |
| Comparative Examples 5~8 | ATBC | No addition of melt strength enhancer | stearic acid | styrene-methacrylate-glycidyl acrylate polymer | polycarbodiimide |
| Comparative Example 9 | ATBC | acrylic copolymer | stearic acid | styrene-methacrylate-glycidyl acrylate polymer | polycarbodiimide |
| Comparative Example 10 | ATBC | acrylic copolymer | stearic acid | styrene-methacrylate-glycidyl acrylate polymer | No addition of anti-hydrolysis agent |
| Comparative Example 11 (Transparent layer extrusion) | ATBC | No addition of melt strength enhancer | No addition of lubricant | styrene-methacrylate-glycidyl acrylate polymer | polycarbodiimide |
| Comparative Example 12 | ATBC | No addition of melt strength enhancer | stearic acid | styrene-methacrylate-glycidyl acrylate polymer | polycarbodiimide |
| Comparative Example 13 | ATBC | acrylic copolymer | No addition of lubricant | styrene-methacrylate-glycidyl acrylate polymer | polycarbodiimide |
| Comparative Example 14 | ATBC | acrylic copolymer | stearic acid | styrene-methacrylate-glycidyl acrylate polymer | No addition of anti-hydrolysis agent |
| Comparative Example 15 | ATBC | acrylic copolymer | stearic acid | styrene-methacrylate-glycidyl acrylate polymer | polycarbodiimide |

Physical properties of the flooring materials according to the examples and the comparative materials were evaluated. Evaluation results are shown in Tables 4 and 5 (based on relative evaluation with a perfect score being 5 points).

TABLE 4

| Sample | Kind of layer | Impact resistance | Thermal resistance | Gloss | Molding processibility | Economic feasibility | Calendering availability | Tensile strength |
|---|---|---|---|---|---|---|---|---|
| Example 1 | Transparent layer (Calendering) | 5 | 4 | 5 | 5 | 4 | 4 | 4 |
|  | Print layer | 4 | 4 | 5 | 4 | 4 | 4 | 4 |
|  | Base layer | 4 | 4 | — | 5 | 4 | 5 | 4 |
|  | Release layer | 4 | 4 | 4 | 5 | 4 | 5 | 5 |
| Example 2 | Transparent layer (Calendering) | 5 | 5 | 5 | 5 | 4 | 3 | 5 |
| Example 3 | Transparent layer (Calendering) | 5 | 5 | 4 | 5 | 5 | 4 | 3 |
| Example 4 | Transparent layer (Calendering) | 5 | 5 | 4 | 5 | 3 | 5 | 5 |
| Example 5 | Transparent layer (Calendering) | 5 | 5 | 4 | 5 | 3 | 5 | 5 |
| Example 6 | Print layer | 3 | 4 | 4 | 5 | 5 | 3 | 3 |
| Example 7 | Print layer | 5 | 4 | 4 | 5 | 5 | 4 | 4 |
| Example 8 | Print layer | 5 | 4 | 5 | 5 | 4 | 4 | 4 |
| Example 9 | Print layer | 5 | 3 | 4 | 5 | 4 | 4 | 3 |
| Example 10 | Base layer | 5 | 4 | 5 | 4 | 5 | 3 | 4 |
| Example 11 | Base layer | 5 | 3 | 5 | 5 | 5 | 4 | 4 |
| Example 12 | Release layer | 3 | 4 | 3 | 4 | 5 | 4 | 4 |
| Example 13 | Release layer | 3 | 3 | 4 | 3 | 5 | 3 | 3 |
| Example 14 | Release layer | 5 | 3 | 4 | 4 | 4 | 1 | 3 |

TABLE 5

| Sample | Kind of layer | Impact resistance | Thermal resistance | Gloss | Molding processibility | Economic feasibility | Calendering availability | Tensile strength |
|---|---|---|---|---|---|---|---|---|
| Comparative Example 1 | Transparent layer (Calendering) | 4 | 3 | 4 | 2 | 5 | 2 | 3 |
| Comparative Example 2 | Print layer | 4 | 1 | 3 | 1 | 5 | 1 | 3 |
| Comparative Example 3 | Release layer | 4 | 2 | 3 | 2 | 5 | 2 | 3 |
| Comparative Example 4 | Base layer | 4 | 3 | — | 3 | 5 | 3 | 3 |
| Comparative Example 5 | Transparent layer | 2 | 3 | 4 | 1 | 4 | 1 | 3 |
| Comparative Example 6 | Print layer | 2 | 2 | 4 | 1 | 4 | 1 | 3 |
| Comparative Example 7 | Release layer | 3 | 3 | 4 | 1 | 4 | 1 | 3 |
| Comparative Example 8 | Base layer | 1 | 3 | — | 1 | 4 | 1 | 3 |
| Comparative Example 9 | Transparent layer (Calendering) | 3 | 3 | 5 | 2 | 5 | 1 | 2 |
| Comparative Example 10 | Transparent layer (Calendering) | 3 | 3 | 5 | 3 | 5 | 2 | 3 |
| Comparative Example 11 | Transparent layer (Extrusion) | 4 | 5 | 5 | 5 | 4 | — | 5 |
|  | Print layer | 4 | 4 | 5 | 4 | 4 | 4 | 4 |
|  | Base layer | 4 | 4 | — | 5 | 4 | 5 | 4 |
|  | Release layer | 4 | 4 | 4 | 5 | 4 | 5 | 5 |
| Comparative Example 12 | Transparent layer (Calendering) | 2 | 3 | 4 | 1 | 4 | 1 | 3 |
| Comparative Example 13 | Transparent layer (Calendering) | 5 | 2 | 4 | 3 | 4 | 1 | 4 |
| Comparative Example 14 | Release layer | 4 | 3 | 5 | 3 | 5 | 2 | 3 |
| Comparative Example 15 | Transparent layer (Calendering) | 3 | 3 | 4 | 2 | 4 | 2 | 3 |

Although some exemplary embodiments of the present invention have been described with reference to the accompanying drawing, it will be understood by those skilled in the art that these embodiments are provided for illustrative purposes only, and various modifications, changes, alterations and equivalent embodiments can be made without departing from the scope of the present invention. Therefore, the scope and spirit of the present invention should be defined by the accompanying claims.

The invention claimed is:

1. A flooring material using a polylactic acid (PLA) resin, comprising:
   a base layer;
   a print layer formed on top of the base layer and having a printed pattern on an upper surface of the print layer;
   a transparent layer formed on the top of the print layer; and
   an anti-hydrolysis agent,
   wherein the base layer, the print layer and the transparent layer include a 100% amorphous PLA resin comprising acetyl tributyl citrate as a non-phthalate plasticizer, styrene-methacrylate-glycidyl acrylate polymer as a chain extender and an acrylic copolymer as a melt strength enhancer,
   wherein the base layer comprises 5 to 100 parts by weight of acetyl tributyl citrate, 0.01 to 10 parts by weight of styrene-methacrylate-glycidyl acrylate polymer and 0.1 to 20 parts by weight of the acrylic copolymer based on 100 parts by weight of the PLA resin, the base layer further comprising at least 10 parts by weight but less than 200 parts by weight of wood flour and/or at least 5 parts by weight but less than 20 parts by weight of pine resin based on 100 parts by weight of the PLA resin,
   wherein the print layer comprises 5 to 60 parts by weight of acetyl tributyl citrate, 0.01 to 10 parts by weight of styrene-methacrylate-glycidyl acrylate polymer and 0.1 to 20 parts by weight of the acrylic copolymer based on 100 parts by weight of the PLA resin, and
   wherein the transparent layer comprises 5 to 50 parts by weight of acetyl tributyl citrate, 0.01 to 10 parts by weight of styrene-methacrylate-glycidyl acrylate polymer, 10 parts by weight or less of the anti-hydrolysis agent and 0.1 to 20 parts by weight of the acrylic copolymer based on 100 parts by weight of the PLA resin.

2. The flooring material of claim 1, further comprising: a surface treatment layer formed on top of the transparent layer.

3. The flooring material of claim 1, wherein the transparent layer has a thickness of 0.10 to 1.0 mm.

4. The flooring material of claim 1, wherein the print layer has a thickness of 0.01 to 0.3 mm.

5. The flooring material of claim 1, wherein the base layer has a thickness of 1.00 to 5.0 mm.

6. The flooring material of claim 1, wherein the anti-hydrolysis agent is selected from the group including: polycarbodiimide, carbodiimide, and oxazoline.

7. The flooring material of claim 1, comprising:
a release layer formed on a lower surface of the base layer, wherein the release layer includes the PLA resin.

8. The flooring material of claim 7, wherein the release layer has a thickness of 0.10 to 2.0 mm.

9. The flooring material of claim 7, wherein the release layer comprises 5 to 60 parts by weight of the non-phthalate plasticizer and 0.1~20 parts by weight of the acrylic copolymer based on 100 parts by weight of the PLA resin.

10. The flooring material of claim 9, wherein the release layer further comprises at least one of 0.01 to 10 parts by weight of the lubricant, 0.01 to 10 parts by weight of the chain extender, 10 parts by weight or less of the anti-hydrolysis agent, 500 parts by weight or less of calcium carbide, 200 parts by weight or less of wood flour, and 20 parts by weight or less of pine resin based on 100 parts by weight of the PLA resin.

11. The flooring material of claim 1, wherein the PLA resin further comprises at least one of a lubricant.

12. The flooring material of claim 11, wherein the PLA resin further comprises at least one of calcium carbide and titanium dioxide.

13. The flooring material of claim 11, wherein the transparent layer further comprises at least one of 0.01 to 10 parts by weight of the lubricant and 10 parts by weight or less of the anti-hydrolysis agent based on 100 parts by weight of the PLA resin.

14. The flooring material of claim 11, wherein the print layer further comprises at least one of 0.01 to 10 parts by weight of the lubricant, 10 parts by weight or less of the anti-hydrolysis agent, 100 parts by weight or less of calcium carbide ($CaCO_3$), and 50 parts by weight or less of titanium dioxide ($TiO_2$) based on 100 parts by weight of the PLA resin.

15. The flooring material of claim 11, wherein the base layer further comprises 0.01 to 10 parts by weight of a higher fatty acid as the lubricant, 10 parts by weight or less of the anti-hydrolysis agent, and calcium carbide 1,000 parts by weight or less based on 100 parts by weight of the PLA resin.

* * * * *